Figure 1:
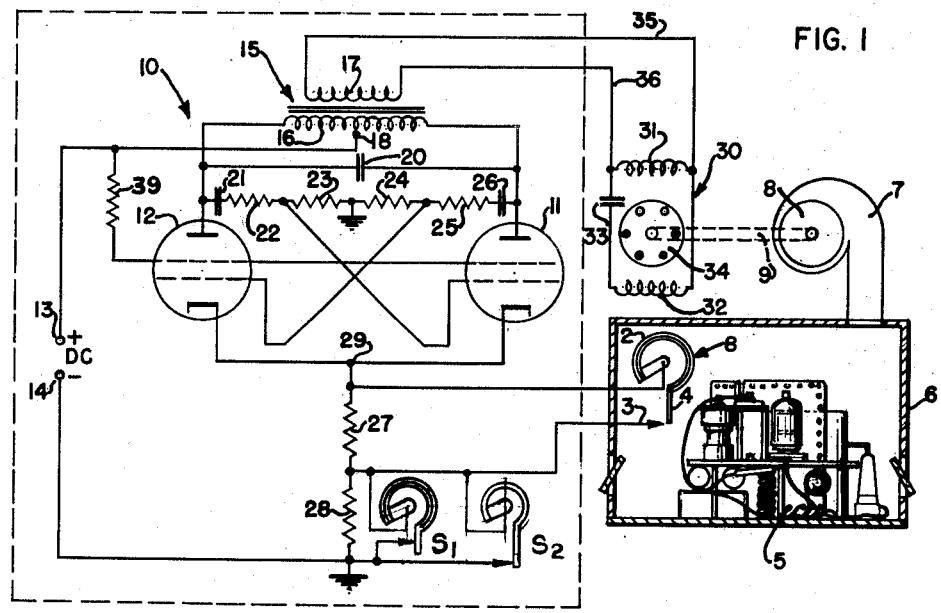

INVENTOR
HENRY SUTER

BY

ATTORNEY

Patented July 28, 1953

2,646,931

UNITED STATES PATENT OFFICE 2,646,931

CONTROLLABLE POWER SOURCE FOR ALTERNATING CURRENT BLOWER MOTORS

Henry Suter, Wellesley, Mass.

Application March 22, 1949, Serial No. 82,891

8 Claims. (Cl. 236—49)

(Granted under Title 35, U. S. Code (1952), sec. 266)

The present invention is related to apparatus for controlling the temperature of airborne equipment and more particularly to the control of electric motor driven air blowers for cooling electronic apparatus.

In modern aircraft, and especially certain types of military aircraft, it is highly desirable to maintain ultra high frequency radio transmitting apparatus at a constant temperature in order to minimize drift of transmitter frequency caused by the changes in temperature which are normally encountered in the operation of the apparatus. Forced air cooling is commonly used to regulate temperatures on aircraft in which an air scoop collects air from the forward motion of the plane through the air and directs the air flow to the apparatus to be cooled. Where accurate control of temperature is required, a greater degree of control is required over the flow of air than an air scoop provides, particularly while the plane is on the ground and the air scoop provides little or no cooling. Further, the cooling air may be expected to vary through wide temperature and pressure ranges from sea level to 50,000 feet altitude.

For this reason an electric motor driven blower is often employed to produce the desired flow of cooling air. However, although the speed of direct current motors may be easily controlled in response to the switching action of a thermostat responsive to the temperature of the apparatus, the use of direct current motors has been found to be unsatisfactory for airborne equipment because brush and commutator wear and arcing, especially at high altitudes, shortened the useful life of the motor and, moreover, induced conisderable noise in other electronic apparatus.

Alternating current generators have become quite common on aircraft since increasing electrical loads on aircraft have required maximum power output from a given physical size and weight. Unfortunately the characteristics of such generators have produced outputs whose frequency varies over wide limits, often from 400 to as high as 2600 cycles per second. Satisfactory control of motor operation from a power source so variable in frequency is impossible with available motors.

It is, therefore, an object of this invention to provide a separate controlled power source for an alternating current blower motor where the primary power source is unsuitable.

It is also an object of the invention to provide a cooling system for aircraft apparatus in which the blower motor speed is controlled from a power source in which the output is controlled in response to the ambient temperature of the apparatus.

It is a further object of the invention to provide a cooling system for aircraft apparatus in which the blower motor speed is controlled from a power source in which the output is controlled in response to the temperature and pressure of the intake air.

It is a further object of the invention to provide a cooling system for aircraft electronic equipment in which the flow of cooling air is controlled so that maximum blower motor speed will be reached only if the intake air is relatively warm or the intake air is relatively thin.

Figure 2:
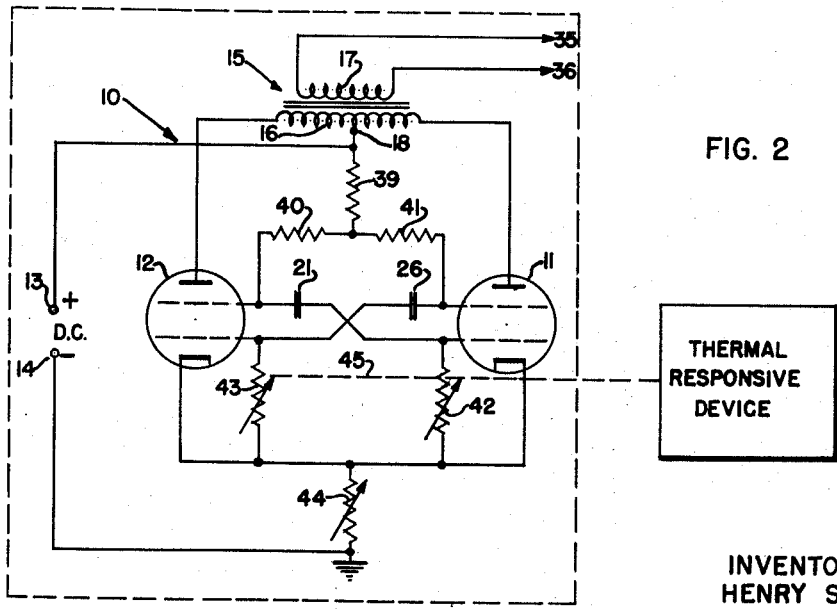

These and other objects of the invention will be more fully understood from the following detailed description, taken in connection with the accompanying drawing in which:

Figure 1 is a schematic wiring diagram showing one embodiment of the invention; and Figure 2 is a schematic wiring diagram showing a modification of the embodiment of Figure 1.

In Figure 1, a radio transmitter 5, is shown totally enclosed in a suitable shielding housing 6. Mounted in one wall of housing 6 is shown an air blower 7 in which an impeller 8 is suitably mounted in bearings (not shown) and adapted to be rotated through a mechanical coupling 9 by the two phase electric motor, generally indicated at 30. In the case of airborne apparatus, the air intake to impeller 8 may be considered as communicating by a tube (not shown) to the exterior of the aircraft. Housing 6 is shown as being provided with ventilating louvres in the side walls to permit the circulation of the cooling air through the housing to the exterior.

A thermal responsive device 8, which is shown as having a bimetallic element 2 for actuating the normally open contacts 3 and 4, is mounted inside housing 6 where it is responsive to the ambient temperature of transmitter 5. The thermal responsive device 8 may be a conventional thermostat which is manually adjustable to close contacts 3 and 4 at a predetermined set value of temperature.

The air blower drive motor 30 is energized through leads 35 and 36 connected to the secondary winding 17 of output transformer 15 of the alternating current power source, generally indicated at 10. Although the motor 30 may be any conventional alternating current motor, a two-phase induction motor is illustrated in Figure 1. The motor consists of two stator windings 31 and 32, spaced 90° electrically from each other, and a rotor 34 which may be the common squirrel cage type motor. One stator winding 31 is shown connected directly across the alternating current leads 35 and 36 while a phase-splitting condenser 33 is placed in series with the second stator winding 32. The current in coil 32 is thereby made to lead the voltage by some angle less than 90°, while the current in coil 31 lags the voltage by some angle less than 90°. The current in the two windings can then be made to have the required 90° phase difference for operation by selection of the proper size of capacitor. The speed of a motor of this type is variable over a useful range by varying the amplitude of the voltage impressed upon the stator windings.

Although the frequency of the alternating current is not critical, in general, larger equipment is required for lower frequencies. For airborne apparatus where weight is an important consideration, an operating frequency of approximately 400 cycles per second was selected largely because commercial motors are available designed to operate efficiently on 400 cycles.

The multivibrator type oscillator, illustrated in Figure 1, is one suitable form for generating a controllable alternating current power. Tubes 11 and 12 are the two stages of a multivibrator. A source of direct current power, which may be the source of direct current power for the radio transmitter 5, is required for terminals 13 and 14. The positive potential at terminal 13 is applied by means of the center tap 18 of winding 16 of output transformer 15 through the two halves of the winding 16 to the plates of tubes 11 and 12. The grid of tube 11 is returned to ground through resistor 23 and the grid of tube 12 is returned to ground through resistor 24. The grid of tube 11 is coupled to the plate of tube 12 through capacitor 21 and resistor 22 and the grid of tube 12 is coupled to the plate of tube 11 through capacitor 26 and resistor 25. The screen grids of tubes 11 and 12 are connected together and connected to the positive terminal of the direct current supply through resistor 39. The cathodes of tubes 11 and 12 are connected together and grounded through bias resistors 27 and 28 connected in series. The circuit for heating the cathodes of the tubes is omitted throughout the drawing for the sake of clearness.

The multivibrator oscillator circuit is equivalent to a two stage resistance coupled amplifier in which the output of the second stage is the input of the first stage. Such a circuit will sustain oscillations because each tube produces a phase shift of 180°, thereby causing the output of the second tube to supply to the first tube an input voltage that has exactly the right phase to sustain oscillations. The frequency of the oscillations is dependent upon the potentials applied to the circuit, tube characteristics and upon the value of capacity and resistance in the grid circuits of the two tubes. The rate at which the charges on capacitor 21 and capacitor 26 can be discharged through resistances 22 and 23 or 24 and 25, respectively, to ground largely determines the frequency of oscillation. The inductance of output transformer 15 and the shunt capacitor 29 serve to modify the wave form of the oscillations so that a reasonable approximation of a sinusoidal voltage is supplied to motor 30. Since, in the circuit disclosed in Figure 1, oscillator 10 is a conventional free running symmetrical multivibrator, further discussion concerning the theory of its operation is believed unnecessary.

The contacts 3 and 4 of thermal responsive device 8 are connected to shunt bias resistor 27 with a short circuit when the contacts are closed by movement of the thermal responsive device 8. In a similar manner bias resistor 28 is shunted by short-circuiting switches S₁ and S₂ whose purpose will be explained below.

In operation, when contacts 3 and 4 are open, the temperature within housing 6 is below the temperature for which the thermal responsive device is set. Resistors 27 and 28 bias tubes 11 and 12 so that the voltage developed in winding 17 of output transformer 15 by the oscillator 10 is just sufficient to run motor 30 at a minimum speed and hence a minimum of cooling air is forced through housing 6. When the temperature within housing 6 rises and the thermal responsive device 8 closes contacts 3 and 4, the bias potential on the cathodes of tubes 11 and 12 is reduced by the short circuit on resistor 27 and the oscillator output voltage rises to a value so that the electric motor 30, and hence the blower impeller 8, runs at a moderate speed. When the temperature within housing 6 drops as a result of the cooling air circulating through the housing, the thermal responsive device breaks contacts 3 and 4, resistor 27 again acts to bias the tubes 11 and 12, the output voltage of the oscillator 10 is lowered and the motor 30 runs slowly. Thus the system acts to blow cooling air into the housing 6 when the temperature of the housing exceeds the predetermined set value of thermal responsive device 8 and to remain shut off when the temperature of the housing 6 is below the set value. The operation may be summarized that when the temperature within the housing 6 is below the set value, the oscillator output voltage is at an amplitude such that motor 30 runs slowly, and when the temperature within the housing 6 exceeds the set value, the output voltage of the oscillator is adjusted to operate the motor 30 at a normal rate of speed.

It is obvious that it is possible to substitute other conventional types of thermal responsive devices, so that other types of control action are obtained in place of the on-and-off control action disclosed. For example, a thermostat in which the motion of the thermal responsive element acts to change the value of a variable resistance could be used either in place of resistor 27 or in shunt with resistor 27 to obtain a continuously variable oscillator output voltage and hence a motor speed proportional or corresponding to the value of the temperature of the housing 6.

It is expected that the normal rate of speed of motor 30, referred to above, will provide an adequate volume of cooling air under the usual conditions of operation. However, under the limiting conditions of the expected range of operation, such as high intake air temperature or high altitude, the air blower may be unable to supply enough cooling air to maintain the housing 6 at the predetermined set value of temperature. Accordingly, provision is made to drive the motor 30 at a maximum speed whenever predetermined limits of air temperature or altitude are exceeded. Switch S₁, for example, may be taken to represent a thermal responsive device, similar to the thermal device 8, but located to be responsive to the temperature of the intake air. Thus, when the intake air temperature exceeds the value for which the switch S₁ is set to close its contacts, the resistor 28 is shorted out of the bias circuit of the cathodes of tubes 11 and 12 and the voltage output of the oscillator 10 is permitted to reach a maximum, provided contacts 3 and 4 are also closed. The motor speed is then a maximum and the blower delivers all the available cooling air to the housing. Similarly, switch $S_2$ may be taken to represent a conventional pressure sensitive device, for purposes of illustration shown as a Bourdon tube, arranged to be responsive to the atmospheric pressure of the intake air. By this means, the speed of the driving motor may be at its maximum whenever the airborne apparatus exceeds a preset value of altitude at which normal operation of the blower fails to provide an adequate volume of cooling air.

Figure 2 illustrates a modification of the invention in which the air blower drive motor may be a synchronous motor the speed of which is varied by making the frequency of the oscillator variable in response to variations in the temperature of the housing 6.

As in Figure 1, tubes 11 and 12 are the two stages of a multivibrator oscillator. The positive potential at terminal 13 is applied to the screen grid of tube 11 through resistor 39 and resistor 41. The screen grid of tube 12 is connected to terminal 13 through resistor 40 and resistor 39. The control grid of tube 11 is coupled to the screen grid of tube 12 through capacitor 21 and the control grid of tube 12 is coupled to the screen grid of tube 11 through capacitor 26. The control grids of tubes 11 and 12 are connected to the common cathode connection through variable resistors 42 and 43, respectively. The mechanical motion which serves to vary the value of resistance of resistors 42 and 43 is shown connecting the two resistors together by a common shaft 45 so that the same variation in value is imposed equally on the two resistors. The common cathode circuit of the two tubes 11 and 12 is shown returned to ground and to the negative terminal 14 of the direct current power source through resistor 44 which may be variable. As before, the ouput transformer 15 serves to apply the power generated by oscillator 10 to the air blower driving motor through leads 35 and 36.

The common shaft 45 of the variable resistors 42 and 43 can be actuated by the angular motion obtained from the action of a thermal responsive device responsive to the temperature within housing 6 (Figure 1). In this way, the discharge time of capacitors 21 and 26 can be varied to vary the frequency of the multivibrator oscillator in response to the temperature within the housing. A synchronous motor connected to this variable frequency power source will have a speed which is proportional to the temperature of the housing. Similarly resistor 44 is shown to be variable, however, its variation may be in response to variations in the temperature or pressure or both of the intake air, corresponding to the function of switches $S_1$ and $S_2$ of Figure 1.

However, it should be noted that for the variable frequency system the operating range is limited somewhat since synchronous motors designed to operate efficiently at a specified frequency lose efficiency and have excessive heating at lower frequencies or lose torque and power at higher frequencies than the specified frequency.

Although there is shown and described herein only certain specific embodiments of this invention, many modifications possible thereof will be readily apparent to those familiar with the art. Therefore, this invention is not to be limited except insofar as is necessitated by the prior art and the spirit of the appended claims.

The invention described herein may be manufactured and used by or for the Government of the United States of America for government purposes without the payment of any royalty thereon or therefor.

What is claimed is:

1. In a system for controlling the ambient temperature of electronic apparatus by regulating the flow of cooling air over said apparatus, in combination, an air blower, an alternating current motor adapted to drive said blower, a source of direct current energy, an electronic oscillator having a plurality of electron tubes biased from said source to generate an output of substantially constant frequency, means connecting said motor to the output of said oscillator, and means responsive to the ambient temperatures of said cooling air and said apparatus to vary the bias of said tubes to control the output characteristics of said oscillator, whereby the speed of said motor and hence the flow of cooling air from said blower are controlled to maintain the ambient temperature of said apparatus substantially constant.

2. In a system for controlling the ambient temperature of electronic apparatus by regulating the flow of cooling air over said apparatus, in combination, an air blower, an alternating current motor adapted to drive said blower, a source of direct current energy, an electronic oscillator having a plurality of electron tubes biased from said source to generate an output of substantially constant frequency, means connecting said motor to the output of said oscillator, means responsive to the ambient temperature of said apparatus to vary the bias of said tubes to control the output voltage of said oscillator, and means responsive to the temperature of the intake air of said blower to vary the bias of said tubes to control the output voltage of said oscillator, whereby the speed of said motor and the flow of cooling air from said blower are controlled to maintain the ambient temperature of said apparatus substantially constant.

3. In a system for controlling the ambient temperature of electronic apparatus by regulating the flow of cooling air over said apparatus, in combination, an air blower, an alternating current motor adapted to drive said blower, a source of direct current energy, an electronic oscillator having a plurality of electron tubes biased from said source to generate an output of substantially constant frequency, means connecting said motor to the output of said oscillator, means responsive to the ambient temperature of said apparatus to vary the bias of said tubes to control the output voltage of said oscillator, and means responsive to the pressure and temperature of the intake air of said blower to vary the bias of said tubes to control the output voltage of said oscillator, whereby the speed of said motor and the flow of cooling air from said blower are controlled to maintain the ambient temperature of said apparatus substantially constant.

4. In a system for controlling the ambient temperature of electronic apparatus by regulating the flow of cooling air over said apparatus, in combination, an air blower, a synchronous alternating current motor adapted to drive said blower, a source of direct current energy, an electronic oscillator energized from said source to generate an alternating current output, means connecting said motor to the output of said oscillator, means responsive to the ambient temperature of said apparatus to vary the frequency of the output of said generator, and means responsive to the temperature of the intake air to vary said oscillator output frequency, whereby the speed of said motor and hence the flow of cooling air is controlled to maintain constant the ambient temperature of said apparatus.

5. In a system for controlling the ambient temperature of electronic apparatus by regulating the flow of cooling air over said apparatus, in combination, an air blower, a synchronous alternating current motor adapted to drive said blower, a source of direct current energy, an electronic oscillator energized from said source to generate an alternating current output, means connecting said motor to the output of said oscillator, means responsive to the ambient temperature of said apparatus to vary the frequency of the output of said generator, and means responsive to the pressure and temperature of said intake air to vary said oscillator output frequency, whereby the speed of said motor and hence the flow of cooling air is controlled to maintain constant the ambient temperature of said apparatus.

6. A system for controlling the temperature of an enclosed region by regulating the flow of air therethrough comprising, an air blower adapted to draw air into said region from the outside atmosphere, an alternating current motor mechanically coupled to drive said blower, a source of direct current energy, an electronic oscillator having a plurality of electron tubes biased from said source to generate an alternating current output, means energizing said motor from said oscillator output, means responsive to the temperature of said region for controlling the operating bias of said tubes to vary the output characteristics of said oscillator, and means responsive to the pressure and temperature of the intake air of said blower to vary the bias of said tubes to control the output characteristics of said oscillator whereby the speed of said motor and hence the flow of air is adjusted to maintain substantially constant the temperature of said region.

7. A system for controlling the temperature of an enclosed region by regulating the flow of air therethrough comprising, an air blower adapted to draw air into said region from the outside atmosphere, an alternating current motor mechanically coupled to drive said blower, a source of direct current energy, an electronic oscillator energized from said source to generate an alternating current output, means energizing said motor from said oscillator output, means responsive to the temperature of said region for controlling the frequency of the output of said oscillator, and means responsive to the pressure and temperature of the intake air of said blower to vary the bias of said tubes to control the frequency of said oscillator whereby the speed of said motor and hence the flow of air is adjusted to maintain substantially constant the temperature of said region.

8. In a system for controlling the ambient temperature of electronic apparatus by regulating the flow of cooling air over said apparatus, in combination, an air blower, an alternating current motor adapted to drive said blower, a source of direct current energy, an electronic oscillator having a plurality of electron tubes biased from said source to generate an alternating current output of substantially constant frequency, means connecting said motor to the output of said oscillator, means normally biasing said oscillator tubes to generate an output voltage just sufficient to run said motor at a minimum speed, normally open switching means responsive to the ambient temperature of said apparatus to bias said oscillator tubes to generate a higher voltage thereby increasing said motor speed, and normally open switching means responsive to the temperature and pressure of the intake air to bias said oscillator tubes to generate a maximum output voltage such that maximum blower speed is provided when the intake air temperature exceeds a predetermined value or when the intake air temperature falls below a predetermined value, whereby the speed of said motor and hence the flow of cooling air are controlled to maintain said ambient temperature substantially constant.

HENRY SUTER.

References Cited in the file of this patent

UNITED STATES PATENTS

| Number | Name | Date |
|---|---|---|
| 1,925,822 | Shurtleff | May 8, 1931 |
| 1,951,276 | Edwards et al. | Mar. 13, 1934 |
| 2,167,472 | Bedford | July 25, 1939 |
| 2,189,461 | Donle | Feb. 6, 1940 |
| 2,213,582 | Hall | Sept. 3, 1940 |
| 2,297,926 | Usselman | Oct. 6, 1942 |
| 2,303,654 | Newton | Dec. 1, 1942 |
| 2,444,568 | Isserstedt | July 6, 1948 |
| 2,454,038 | Crever | Nov. 16, 1948 |
| 2,502,189 | Walker | Mar. 28, 1950 |
| 2,519,481 | Kubie | Aug. 22, 1950 |
| 2,534,174 | Lehane | Dec. 12, 1950 |

FOREIGN PATENTS

| Number | Country | Date |
|---|---|---|
| 697,925 | Germany | Oct. 26, 1940 |